United States Patent [19]

Lucas et al.

[11] 4,293,427
[45] Oct. 6, 1981

[54] DRILLING FLUID CONTAINING A COPOLYMER FILTRATION CONTROL AGENT

[75] Inventors: James M. Lucas; Dorothy P. Enright; Alphonse C. Perricone, all of Houston, Tex.

[73] Assignee: Milchem Incorporated, Houston, Tex.

[21] Appl. No.: 131,329

[22] Filed: Mar. 18, 1980

Related U.S. Application Data

[63] Continuation-in-part of Ser. No. 19,219, Mar. 9, 1979, abandoned.

[51] Int. Cl.$^3$ ................................................. C09K 7/02
[52] U.S. Cl. ............................. 252/8.5 C; 252/8.5 A
[58] Field of Search ......... 252/8.5 C, 8.55 R, 8.55 D, 252/8.5 A

[56] References Cited

U.S. PATENT DOCUMENTS

| | | | |
|---|---|---|---|
| 2,718,497 | 9/1955 | Oldham et al. | 252/8.5 |
| 3,679,000 | 7/1972 | Kaufman | 252/8.55 X |
| 3,734,873 | 5/1973 | Anderson et al. | 252/8.5 |
| 4,024,040 | 5/1977 | Phalangas et al. | 252/8.55 X |
| 4,048,077 | 9/1977 | Engelhardt et al. | 252/8.5 |
| 4,107,057 | 8/1978 | Dill et al. | 252/8.55 |

*Primary Examiner*—Herbert B. Guynn
*Attorney, Agent, or Firm*—William C. Norvell, Jr.

[57] ABSTRACT

The invention relates to an aqueous drilling fluid composition, a filtration control agent for utilization in said aqueous drilling fluid, and a method of forming a filter cake on the wall of a well for the reduction of filtrate from said drilling fluid, by utilization of a copolymer of: (1) a (meth) acrylamido alkyl sulfonic acid or alkali metal salt thereof; and (2) a (meth) acrylamide or N-alkyl (meth) acrylamide. The copolymer may be cross-linked with a quaternary ammonium salt cross-linking agent.

25 Claims, No Drawings

DRILLING FLUID CONTAINING A COPOLYMER FILTRATION CONTROL AGENT

CROSS-REFERENCE TO RELATED APPLICATION

This application is a continuation-in-part application of co-pending application Ser. No. 019,219, filed Mar. 9, 1979, now abandoned and assigned to the same assignee as this application, entitled "Copolymer Filtration Control Agent".

BACKGROUND OF THE INVENTION

1. Field of the Invention

The invention relates to the utilization of a copolymer of: (1) a (meth) acrylamido alkyl sulfonic acid or alkali metal salt thereof; and (2) a (meth) acrylamide or N-alkyl (meth) acrylamide or a cross-linked copolymer of (1) and (2) above, to effectively reduce the filtrate loss of an aqueous drilling fluid used in the drilling of a subterranean well.

2. Description of the Prior Art

It is generally agreed among those skilled in the art that a rotary system is an acceptable form of drilling an oil or gas well. This system depends upon the rotation of a string of drill pipe to the bottom of which is attached a multi-pronged drilling bit. The bit cuts into the earth causing the cuttings to accumulate as drilling continues. As a result, a drilling fluid must be used to carry these cuttings to the surface for removal, thus allowing the bit to continue functioning and the bottom hole to be kept clean and free of cuttings at all times. Drilling systems other than the rotary system are sometimes employed during drilling operations. Nevertheless, these systems still require a drilling fluid to remove the bore hole cuttings and to otherwise perform functions related to drilling fluids.

Oil-producing formations are generally porous layers having varying degrees of permeability to the flow of fluids such as oil, water, or gas. Consequently, the rate of oil production is largely determined by the rate of flow through these permeable formations which, in turn, is dependent upon the porosity or permeability of the sand or stone present. In drilling through such a porous layer, it is desirable to employ a drilling fluid having such characteristics that excessive amounts of liquids or solids are prevented from penetrating through the porous formation. The ability of the drilling fluid to prevent excessive formation fluid penetration is called filtration control.

Materials that have been used in the past to control filtration rates of aqueous drilling fluids by plugging, producing cakes, or similar methods, have included materials such as pregelatinized starch, sodium carboxylmethylcellulose, sodium polyacrylates, and lignites. Each of these materials have certain limitations. For example, lignite becomes ineffective in high salt concentrations.

Acrylic and methacrylic derivatives, such as those which are copolymerized with hydrocarbon substituted styrenes, such as alpha methyl styrene, para methyl styrene, 2-4 dimethyl styrene, and the like have been utilized in drilling fluids. For example, U.S. Pat. No. 2,718,497, to Oldham, et al, teaches the use of relatively high molecular weight polymers of these materials to control water loss characteristics of aqueous muds and clay dispersions. Additionally, U.S. Pat. No. 2,650,905 to Fordyce, et al, teaches the use of water soluble sulfonated polystyrene derivatives for filtration control in water-based drilling fluids.

The prior art has utilized acrylic acid derivatives as thickeners for numerous commercial purposes, including utilization in drilling fluids. For example, U.S. Pat. No. 4,059,552 to Zweigle, et al, teaches the use of acrylamide-sodium acrylate or acrylic acid-substituted acrylates. A similar thickening material is disclosed in U.S. Pat. No. 4,037,035, to Blanc, et al, by utilization of an acrylamide-sodium acrylate constituent with an acrylamide-acrylic acid alkanolamine. Similarly, copolymers of acrylamide and sodium acrylate and acrylate derivitives thereof formed by irradiation polymerization are utilized as thickeners, as disclosed in U.S. Pat. No. 3,926,756 to Restaino. U.S. Pat. No. 3,897,404 to Korte, et al, teaches utilization as thickeners for printing paste and the like of substituted acrylamide-acrylic acid-acrylate derivitives.

Hydrophilic gels derived from 2-hydroxyethyl methacrylate have been found to be useful in a number of medical applications as material for gel filtration, such as copolymers of acrylamide, acrylic ester-2-hydroxyethyl methacrylate, as disclosed in U.S. Pat. No. 3,948,841, to Dusek.

Acrylamide-sodium acrylate-2-hydroxyethyl acrylate cross-linked agents of a comparatively high molecular weight are utilized as soil stabilizers as disclosed in U.S. Pat. No. 3,651,002, to Higashimura, et al.

Acrylic acid derivatives such as copolymers of acrylamide and sodium acrylate derivitives have been frequently and commercially utilized as flocculants for drilling fluids, and are disclosed in U.S. Pat. No. 3,558,545, and No. 3,472,325 to Lummus. Similarly, a copolymer derived from acrylic acid and acrylamide is disclosed in U.S. Pat. No. 3,323,603 to Lummus et al, as a flocculant for aqueous drilling fluids.

Acrylamide/2-acrylamido-2-methyl propane sulfonate and polymers of N-sulfohydrocarbon-substituted acrylamides have been utilized as viscosifiers in waterflooding operations for secondary and tertiary petroleum recovery, such as in: U.S. Pat. No. 3,679,000 issued July 25, 1972, entitled "Secondary Oil Recovery Method Using N-Sulfohydrocarbon-substituted Acrylamide Polymers as Viscosity Increasing Agents"; "A Comparative Evaluation of Polymers For Oil Recovery-Rheological Properties", by Miklos T. Szabo, Society of Petroleum Engineers, A.I.M.E., Paper Number SPE 6601-A; and "Recent Advances In Ion-Containing Polymers", by M. F. Hoover and G. B. Butler (J. Polymer SCL: Symposium No. 45, 1–37, 1974).

In the present invention, enhanced filtration control is obtained by incorporation into an aqueous drilling fluid a filtration control agent consisting essentially of a copolymer of: (1) a (meth) acrylamido alkyl sulfonic acid or alkali metal salt thereof; and (2) a (meth) acrylamide or N-alkyl (meth) acrylamide. The copolymer of (1) and (2) may be enhanced by cross-linking with a quaternary ammonium salt. Although it is not fully understood, it is believed that the copolymer together with the other drilling fluid constituents will produce a filter cake along the bore hole to maintain effective filtration control during circulation of the drilling fluid within the well.

It is an object of this invention to provide a filter cake which is substantially unaffected by comparatively high bore hole temperatures and pressures.

It is a further object of this invention to provide a filtration control agent which will not materially affect the viscosity of the utilized drilling fluid system.

It is a further object of this invention to provide a comparatively low cost, easily prepared, filtration control agent for use in aqueous drilling fluids.

It is a further object of this invention to provide a filtration control agent for aqueous drilling fluids which functions in salt environments within the aqueous system.

It is a further object of this invention to provide a filtration control agent which may be utilized in weighted drilling fluids.

Other objects and advantages of the present invention will be easily appreciated by those skilled in the art from a reading of the description, examples and claims which follow.

SUMMARY OF THE INVENTION

The present invention provides a filter cake-producing substance which is effective after exposure to high temperatures and is operative in salt environments found in aqueous drilling fluids by utilization of a copolymer of: (1) a (meth) acrylamido alkyl sulfonic acid or alkali metal salt thereof; and (2) a (meth) acrylamide or N-alkyl (meth) acrylamide, or a cross-linked copolymer of (1) and (2) above. The copolymer is further characterized in that a 0.5% by weight aqueous solution of said copolymer has a viscosity at about 25° C. of between about 18 centipoises and about 44 centipoises.

DESCRIPTION OF THE PREFERRED EMBODIMENTS

The preparation of the copolymer of the present invention incorporates two monomeric materials, which are: (1) a (meth) acrylamido alkyl sulfonic acid or alkali metal salt thereof; and (2) a (meth) acrylamide or N-alkyl (meth) acrylamide. The copolymer may be cross-linked with a quaternary ammonium salt cross-linking agent.

In the preparation of the copolymer for use in the present invention, any acrylamido alkyl sulfonic acid or alkali metal salt thereof having from 4 carbon atoms in the alkyl portion may be utilized. For example, one may utilize 1,3-acrylamido propyl sulfonic acid, or, preferably the sodium salt thereof. Preferably, sodium 2-acrylamido-2-methyl propane sulfonate is utilized. In preparing the copolymer the 2-acrylamido-2-methyl propane sulfonic acid or alkali metal salt thereof may be used in a reagent range from between about 8 mole percent and about 70 mole percent. In the preferred composition, utilizing the sodium salt of 2-acrylamido-2-methyl propane sulfonate, an amount of about 20 mole percent will be incorporated as an initial reagent.

The present invention also utilizes as an initial reagent any (meth) acrylamide or N-alkyl (meth) acrylamide having from between about 1 and about 3 carbon atoms in the alkyl portion and which is capable of polymerization with the acrylamido alkyl sulfonic acid or alkali metal salt thereof, described above. Preferably, acrylamide will be selected as the monomer, because of its comparatively low cost, availability, and ease of reaction with other reagents. When selecting this monomer for use in the present invention, this reagent should be utilized from between about 30 mole percent to about 91 mole percent. Preferably, about 80 mole percent of acrylamide will be utilized as an initial reagent.

Under some circumstances, it may be desirable to provide the copolymer as a filtration control agent and drilling fluid additive in a cross-linked form to provide more effective filtration control in salt environments, such as sea water. In the preparation of a cross-linked copolymer, the cross-linking agent may be a quaternary ammonium salt, such as 3-methacryloyloxy-2-hydroxy propyl trimethyl ammonium chloride, 3-acrylamido-3-methylbutyl trimethyl ammonium chloride, diallyl dimethyl ammonium chloride, N-methyl 2-vinyl pyridinium methyl sulfate, N-methyl 4-vinyl pyridinium methyl sulfate, N-propyl acrylamido trimethyl ammonium chloride, or, preferably, 2-methacryloyloxy-ethyl trimethyl ammonium methosulfate. As utilized in the present invention, a reagent range of (meth)acryloyloxy alkyl trimethyl ammonium salt from between about 0.2 mole percent to about 4.4 mole percent may be utilized. Preferably, about 0.2 mole percent methacryloyloxy-ethyl trimethyl ammonium methosulfate will be utilized.

When preparing a cross-linked copolymer, one may utilize: between about 8 mole percent to about 70 mole percent of (meth) acrylamido alkyl sulfonic acid or alkali metal salt thereof; between about 30 mole percent and 91 mole percent (meth) acrylamido or N-alkyl methacrylamide; and between about 0.2 mole percent and about 4.4 mole percent of quaternary ammonium salt. Preferably, the cross-linked copolymer will comprise: about 9.8 mole percent (meth) acrylamido alkyl sulfonic acid or alkali metal salt thereof; about 90 mole percent (meth) acrylamide or N-alkyl methacrylamide; and about 0.2 mole percent quaternary ammonium salt.

The polymerization may be promoted by typical initiators used in aqueous systems such as peroxides, persulfates, persulfate-sulfites, and the like. It has been found that the copolymer can be made with small quantities of initiator when the reagents are warmed to about 60° C. The amount of initiator under such condition does not affect the properties of the copolymer as a filtration control agent.

The polymerization of the reagents set forth above may be carried out using a variety of techniques. For example, emulsion, suspension, solution or bulk polymerization techniques may be utilized. The preferred technique is solution.

As an effective filtration control agent, the copolymer may be added to any aqueous base drilling fluid at the drilling or rig location in an amount from between about 0.25 p.p.b. to about 5 p.p.b. (pounds per 42 gallon barrel). The amount needed will vary, of course, depending upon the particular type of aqueous drilling fluid utilized, such as brine, sea water, or the like, the weight of the given drilling fluid, the clayey substances or clayey materials appearing therein, and the presence and amount of other chemical additives, such as ligno-sulfonate deflocculants, and the like. Simple and commercially available testing techniques may be easily utilized at the well site to determine the amount of filtration control additive which must be added to the circulatable drilling fluid to provide effective filtration control in the subterranean well. Because of the loss of material in the well, such as through adsorption onto the surface of the drilled solids and the like, it may be necessary to incrementally add additions of the copolymer to the drilling fluid from time to time to maintain the required concentration.

Effectiveness of the copolymer to control the fluid loss from drilling fluids may be determined by utilization of a simple filtration test. A standardized procedure for determining the filtration rate is described in the "A.P.I. Recommended Practice RP 13 B Standard Procedure for Testing Drilling Fluids", 2nd Edition (April 1969).

The preparation and use of the copolymer to control fluid loss in an aqueous drilling fluid is further described in the examples which follow:

EXAMPLE I

The present Example demonstrates a preparation of the copolymer of the present invention wherein acrylamide, sodium 2-acrylamido-2-methyl propane sulfonate are utilized as the initial monomeric reagents with and without a cross-linking agent. A solution was prepared by mixing 30.2 grams of water and 12.3 grams of 50% caustic soda, which was cooled by an ice-water bath, followed by the incremental addition of 31.8 grams of 2-acrylamido-2-methyl propane sulfonic acid. The acid was added at a rate to maintain the temperature of the solution below about 30° C. The pH of the solution was adjusted and maintained between about 6.8 and about 7.0. A 64.3 gram charge of acrylamide was thereafter added. The solution was warmed to about 30° C. to effect dissolution of the reagents. The solution was transferred to a 250 ml. addition funnel.

A 1-liter jacketed reaction flask equipped with a mechanical stirrer, thermometer, reflux condenser and 250 ml. addition funnel containing the mixture of the monomers was charged with 263 grams of deionized water. The water was heated to 60° C. Approximately 1/10th of the monomer solution was added followed by 1 ml. of an aqueous solution containing 18 mg. of potassium persulfate. An exothermic reaction was noted after approximately 10 minutes after addition of the initiator. The remaining monomer mixture was added dropwise during a one-hour period, and one ml. aliquots of aqueous solution containing 18 mg. of potassium persulfate was added every 6 minutes. The reaction was maintained at a nearly constant temperature by circulating water through the jacket from a constant temperature water bath at about 60° C. The temperature of the reaction mixture increased to about 65° C. during the first half hour and thereafter gradually decreased to 60° C. during the next three hours.

The very viscous gel-like reaction mixture was added slowly to and rapidly stirred with 2 liters of acetone. The product was precipitated into small filterable particles when the mixing and addition techniques was optimized. The product was filtered on a Buchner funnel, washed with small portions of a 1-to-1 mixture of water and acetone. The product was dried at 105° C. to a constant weight, requiring about 24 hours. The yield of the product was nearly quantitative. The product was analyzed for sulphur, which was calculated at 4.87, and was found to be 4.9.

A cross-linked copolymer was prepared, as above, by reacting 1.8 grams of 80% methacryloyloxy ethyl trimethyl ammonium metho sulfate in water, with the monomeric reagents prior to warming of the reagents to 30° C. The procedure and reaction was continued as described for the preparation of the un-cross-linked copolymer.

The monomeric composition of the samples given in Table I below are representative of the copolymer (Samples G through L) and the cross-linked copolymer (Samples A through F), of this invention.

TABLE I

| Sample | Acrylamide (Mole %) | Sodium 2-Acrylamide-2-methyl propane sulfonate (Mole %) | 2-Methacryloyloxy-ethyl trimethyl ammonium methosulfate (mole %) | Methacrylamide (mole %) |
|---|---|---|---|---|
| A | 73.2 | 24.4 | 2.4 | |
| B | 78.3 | 19.5 | 2.2 | |
| C | 75.0 | 24.8 | 0.2 | |
| D | 90.0 | 9.8 | 0.2 | |
| E | 75.0 | 24.5 | 0.5 | |
| F | 90.0 | 9.5 | 0.5 | |
| G | 70.0 | 30.0 | | |
| H | 68.3 | 31.7 | | |
| I | 50.0 | 50.0 | | |
| J | 50.8 | 49.2 | | |
| K | 30.0 | 70.0 | | |
| L | | 50.0 | | 50.0 |

EXAMPLE II

In the present Example, and the Examples which follow, the copolymer of the present invention was tested in simulated drilling fluid environments to determine filtration control characteristics. The indicated amount of the copolymer was slowly sifted into barrel equivalents of a base mud while shearing at moderate speed on an electric mixing apparatus after which shearing was continued for a period of 30 minutes. The pH of the sample was adjusted to about 9.5 with incremental additions of sodium hydroxide, when necessary. Thereafter, each sample was hot rolled in an oven at 150° F. for 16 hours. Thereafter, each sample was permitted to cool to room temperature and the pH was readjusted to about 9.5, when necessary. Flow properties and A.P.I. filtrate tests were performed. Thereafter, some of the samples were again hot-rolled between 300° F. for the indicated time and thereafter cooled to room temperature, the pH again being readjusted to about 9.5, when necessary. Thereafter, flow properties and A.P.I. filtrate were again determined.

In the present Example, a mud system was prepared to simulate a sea water mud. The sample mud had the following composition: 20 lbs./bbl. bentonite; 10.7 lbs./bbl. of commercially available sea water salt; and 1½ lbs./bbl. chrome lignosulfonate. The pH of the mud composition was adjusted to about 9.5 with sodium hydroxide. A typical filtrate analysis of this base mud is as follows: 15,000 mg/l chloride ion; 900 mg/l total hardness, measured as calcium ion; and 400 mg/l calcium ion.

In the present Example, a mud sample was treated with the indicated copolymers described in Example I and evaluated, along with the base mud containing no additive, for purposes of determining effective filtration control, as well as for measuring the rheology of the fluid. The results of the tests are given in Table II, below.

TABLE II

| Concentration lb/bbl. | Identification Sample | Fann Readings | | | | | | Initial Gel | 10 Minute Gel | pH | API Filtrate |
|---|---|---|---|---|---|---|---|---|---|---|---|
| | | 600 | 300 | 200 | 100 | 6 | 3 | | | | |
| 0.5 | A | 18 | 11 | 9 | 6 | 2.5 | 2 | 2 | 8.5 | 9.5 | 27.5 |

TABLE II-continued

| Concentration lb/bbl. | Indentification Sample | Fann Readings 600 | 300 | 200 | 100 | 6 | 3 | Initial Gel | 10 Minute Gel | pH | API Filtrate |
|---|---|---|---|---|---|---|---|---|---|---|---|
| 1.0 | A | 30.5 | 18.5 | 14.5 | 9.5 | 4. | 3.5 | 4 | 9.0 | 9.6 | 20.0 |
| 2.0 | A | 39 | 25.5 | 21 | 15 | 8 | 7.5 | 7.0 | 20 | 9.6 | 12.2 |
| 0.5 | B | 19 | 12 | 9.5 | 6.5 | 3 | 2.5 | 2.5 | 8 | 9.7 | 30.0 |
| 1.0 | B | 24 | 14 | 11 | 7 | 3 | 2.5 | 3 | 7 | 9.6 | 20.4 |
| 2.0 | B | 40 | 25.5 | 20.5 | 14 | 7 | 6.5 | 6.5 | 17 | 9.7 | 11.8 |
| 0.5 | C | 15.5 | 9 | 7 | 4.5 | 2 | 1.5 | 1.5 | 5 | 9.6 | 35 |
| 1.0 | C | 22 | 13 | 10 | 7 | 3 | 2.5 | 2.5 | 7 | 9.6 | 26.6 |
| 2.0 | C | 35 | 20 | 15 | 10 | 3.5 | 3 | 3 | 11 | 9.6 | 13.2 |
| 0.5 | D | 16 | 9 | 7 | 4.5 | 1 | 1 | 2 | 5 | 9.7 | 30.2 |
| 1.0 | D | 17.5 | 10.5 | 8 | 5 | 1 | 1 | 2.5 | 6 | 9.5 | 25.5 |
| 2.0 | D | 31 | 18.5 | 14 | 9 | 2.5 | 2 | 4 | 7 | 9.6 | 13.0 |
| 0.5 | E | 20.5 | 12 | 9 | 6.5 | 3 | 2.5 | 3 | 8 | 9.7 | 22.8 |
| 1.0 | E | 30 | 16.5 | 12.5 | 7.5 | 2.5 | 2 | 2 | 9 | 9.7 | 14.0 |
| 2.0 | E | 57.5 | 35 | 28 | 18 | 7.5 | 6.5 | 6 | 22 | 9.6 | 7.2 |
| 0.5 | F | 16.5 | 9 | 7 | 4 | 1 | 1 | 2 | 6 | 9.5 | 23.0 |
| 1.0 | F | 20.5 | 12 | 9 | 6 | 1 | 1 | 2 | 8 | 9.6 | 8.2 |
| 2.0 | F | 35 | 21 | 16 | 10 | 3 | 3 | 5 | 14 | 10.0 | 8.6 |
| | Base | 15 | 8 | 6.5 | 4 | 1.5 | 1.5 | 1.5 | 5.5 | 9.7 | 54.0 |

EXAMPLE III

In order to determine the effect of temperature upon the ability of the filtration control agent of the present invention to effectively control filtration in a sea water mud sample, Sample "D", as identified in Table I of Example I, was added to the simulated sea water mud identified in Example II at the 1 and 2 lb/bbl. concentration levels. Each sample was first hot rolled at 150° F. for 16 hours after which rheological properties and A.P.I. filtrate were measured. Thereafter, each sample was again hot rolled at a temperature of 325° F. for 10 hours. Thereafter, the samples were permitted to cool, the pH was adjusted, and rheological properties and A.P.I. filtrate readings were taken. The results of this test indicated that the filtration control agent of this invention continues to provide filtration control even after exposure to temperatures above 300° F. The results of this test are set forth in Table III below.

EXAMPLE IV

The present Example demonstrates the ability of the filtration control agent of the present invention to provide effective filtration control in fresh water and saturated salt water mud environments. One fresh water mud system (Mud "IV-A") comprised deionized water containing: 17.5 lb/bbl bentonite; 1 lb/bbl gypsum; 2 lb/bbl sodium chloride; and 1.5 lb/bbl chrome lignosulfonate. The other fresh water mud (Mud "IV-B") was comprised of 22 lb/bbl bentonite and 10.7 lb/bbl sodium chloride. The pH was adjusted to about 9.5. A typical filtrate analysis of the first mud indicated: a chloride ion content of 3,800 mg/l; 300 mg/l calcium ion; and a total hardness of 350 mg/l. The saturated salt water mud system (Mud "IV-C") was a saturated aqueous sodium chloride solution containing 15 lb/bbl of attapulgite. The rheological properties and A.P.I. filtrates of these muds were measured as in earlier tests. Table IV, below reflects the results of these tests.

TABLE III

| Sample | Hot Rolled | Fann Readings 600 | 300 | 200 | 100 | 6 | 3 | Initial Gel | 10 Minute Gel | pH | API Filtrate |
|---|---|---|---|---|---|---|---|---|---|---|---|
| D (1 lb/bbl) | 150° F. 16 hrs. | 30 | 16.5 | 12.5 | 7.5 | 2.5 | 2 | 2 | 9 | 9.7 | 14.0 |
| | 325° F. 10 hrs. | 21 | 13 | 10 | 7 | 2 | 1.5 | 1 | 2 | 9.5 | 23.8 |
| D (2 lb/bbl) | 150° F. 16 hrs. | 57.5 | 35 | 28 | 18 | 7.5 | 6.5 | 6 | 22 | 9.6 | 7.2 |
| | 325° F. 10 hrs. | 34 | 21 | 17 | 11 | 2 | 1.5 | 1.5 | 2.5 | 9.7 | 10.0 |
| Base Mud | 150° F. 16 hrs. | 15 | 8 | 6.5 | 4 | 1.5 | 1.5 | 1.5 | 5.5 | 9.7 | 54 |
| | 325° F. 10 hrs. | 12 | 7 | 5 | 3 | 1.5 | 1 | 1 | 5 | 9.5 | 66.5 |

TABLE IV A

| | | Fresh Water Mud IV-A | | | | | | | | | |
|---|---|---|---|---|---|---|---|---|---|---|---|
| Concentration lb/bbl | Sample No. | Fann Readings Hot Rolled at 150° F. 16 hrs. 600 | 300 | 200 | 100 | 6 | 3 | Initial Gel | 10 Min. Gel | pH | API Filtrate |
| 0.5 | A | 13.5 | 7.5 | 5.5 | 3 | 1 | 1 | 1 | 1.5 | 9.7 | 19.0 |
| 1.0 | A | 16 | 8.5 | 6 | 3.5 | 1 | 1 | 1 | 1.5 | 9.7 | 16.0 |
| 1.5 | A | 18.5 | 10.5 | 8.5 | 4.5 | 1.5 | 1 | 1 | 1.5 | 9.9 | 11.8 |
| 0.5 | B | 11 | 6 | 4 | 2.5 | 1 | 0.5 | 0.5 | 1 | 9.8 | 18.6 |
| 1.0 | B | 15.5 | 8.5 | 6.0 | 3.5 | 1 | 1 | 1 | 1 | 9.6 | 14.4 |
| 1.5 | B | 20 | 11 | 8.0 | 5 | 1.5 | 1 | 1 | 1.5 | 10.1 | 11.4 |
| 0.5 | C | 14 | 8 | 5.5 | 3.5 | 1 | 1 | 1 | 1 | 9.9 | 17.8 |
| 1.0 | C | 18 | 10 | 7 | 4 | 1 | 1 | 1 | 1 | 9.9 | 13.6 |
| 1.5 | C | 31 | 17.5 | 13 | 8.5 | 3 | 2.5 | 2.5 | 7 | 9.5 | 14.0 |
| 0.5 | D | 13.5 | 7.5 | 5 | 3 | 1 | 1 | 1 | 1 | 9.9 | 27.2 |
| 1.0 | D | 18 | 10.5 | 8 | 5.5 | 2 | 1.5 | 1.5 | 4 | 9.6 | 18.2 |

TABLE IV A-continued

Fresh Water Mud IV-A

| Concentration lb/bbl | Sample No. | Fann Readings Hot Rolled at 150° F. 16 hrs. | | | | | | Initial Gel | 10 Min. Gel | pH | API Filtrate |
|---|---|---|---|---|---|---|---|---|---|---|---|
| | | 600 | 300 | 200 | 100 | 6 | 3 | | | | |
| 1.5 | D | 22 | 12 | 8.5 | 5 | 1 | 1 | 1 | 1.5 | 10.1 | 11.6 |
| 0.5 | E | 23 | 13 | 9.5 | 6 | 1 | 1 | 1.5 | 3 | 9.4 | 12.4 |
| 1.0 | E | 20 | 12 | 8.5 | 5. | 1 | 1 | 1.5 | 3 | 9.6 | 9.0 |
| 1.5 | E | 28 | 17 | 13 | 8 | 2 | 1 | 2 | 5 | 9.9 | 6.8 |
| 0.5 | F | 13 | 7 | 5.5 | 3.5 | 1 | 1 | 1 | 3 | 9.9 | 12.8 |
| 1.0 | F | 15.5 | 9 | 6 | 3.5 | 0.5 | 0.5 | 1 | 2 | 9.8 | 9.4 |
| 1.5 | F | 20 | 11.5 | 8.5 | 5 | 1 | 1 | 1 | 4 | 9.9 | 8.2 |
| Base Mud | | 10 | 5 | 4 | 2 | 1 | 0.5 | 1 | 1 | 9.5 | 28.4 |

TABLE IV B

SATURATED SALT WATER MUD IV-C

| Concentration lb/bbl | Sample No. | Fann 35 Rheology Hot Rolled 150° F., 16 hrs. | | | | | | Initial Gel | 10 Min. Gel | pH | API Filtrate |
|---|---|---|---|---|---|---|---|---|---|---|---|
| | | 600 | 300 | 200 | 100 | 6 | 3 | | | | |
| 2.0 | A | 30 | 19 | 15 | 11 | 5 | 4 | 5 | 7 | 9.8 | 36.8 |
| 4.0 | | 70 | 49 | 40 | 29 | 9 | 6 | 8 | 16 | 9.5 | 8.4 |
| 2.0 | B | 38 | 22 | 17 | 13 | 5 | 4 | 5 | 7 | 9.5 | 44.8 |
| 4.0 | | 69 | 48 | 39 | 28 | 7 | 5 | 6 | 9 | 9.5 | 7.6 |
| 2.0 | C | 49 | 38 | 33 | 26 | 5 | 5 | 7 | 8 | 9.6 | 25.0 |
| 4.0 | | 52 | 33 | 25 | 15 | 2 | 1.5 | 1.5 | 2.5 | 9.5 | 7.1 |
| 2.0 | D | 45 | 33 | 27 | 21 | 7 | 4 | 6 | 10 | 9.6 | 28.0 |
| 4.0 | | 70 | 48 | 39 | 26 | 6 | 5 | 5 | 11 | 9.6 | 7.8 |
| 2.0 | E | 56 | 40 | 34 | 26 | 10 | 7 | 8 | 10 | 9.7 | 32.0 |
| 4.0 | | 69 | 44 | 34 | 22 | 4 | 3 | 3.5 | 6 | 9.5 | 6.8 |
| 2.0 | F | 43.5 | 28 | 23 | 12.5 | 5.5 | 4 | 7 | 7 | 10.2 | 36 |
| 4.0 | | 98 | 71.5 | 60 | 45 | 10 | 7.5 | 10 | 22 | 10.4 | 6.2 |
| 1.0 | G | 24 | 16 | 13 | 10 | 4 | 3 | 4 | 4 | 8.6 | 137 |
| 3.0 | | 74 | 51 | 40 | 38 | 9 | 7.5 | 7 | 9 | 8.8 | 7.0 |
| 1.0 | H | 22.5 | 15 | 12 | 7 | 3.5 | 3 | 4 | 4 | 9.2 | 110.6 |
| 3.0 | | 56 | 33 | 24.5 | 10.5 | 3.5 | 3 | 3 | 5 | 9.1 | 6.0 |
| 3.0 | I | 56 | 38 | 31 | 22.5 | 8 | 6.5 | 6 | 7 | 9.3 | 10.4 |
| 1.0 | J | 26 | 19 | 16 | 13 | 5.5 | 4 | 5 | 5 | 9.0 | 99 |
| 3.0 | | 34 | 22 | 18 | 13.5 | 7 | 6.5 | 8 | 10 | 9.4 | 51 |
| 1.0 | K | 20.5 | 14 | 12 | 9 | 4.5 | 4 | 6 | 6 | 8.9 | 99 |
| 3.0 | | 40 | 30 | 25 | 19 | 8.5 | 7.5 | 8 | 9 | 9.3 | 49.2 |
| Base Mud | | 32 | 25 | 22 | 19 | 12 | 11 | 11 | 18 | 9.8 | 163 |

TABLE IV C

Fresh Water Mud IV-B

| Concentration lb/bbl | Sample No. | Fann 35 Rheology | | | | | | Initial Gel | 10 Min. Gel | pH | API Filtrate |
|---|---|---|---|---|---|---|---|---|---|---|---|
| | | 600 | 300 | 200 | 100 | 6 | 3 | | | | |
| 0.5 | G | 59 | 49 | 44 | 33.5 | 29 | 28 | 26 | 29 | 8.1 | 19.4 |
| 1.0 | | 78 | 59 | 52 | 44 | 30 | 29 | 30 | 45 | 8.2 | 13.0 |
| 0.5 | H | 54 | 44 | 39 | 34 | 23 | 23 | 23 | 28 | 8.4 | 26.6 |
| 1.0 | | 61 | 48 | 43 | 37 | 25 | 25 | 25 | 47 | 8.3 | 16.6 |
| 0.5 | I | 54 | 45 | 40.5 | 36 | 24 | 24 | 23 | 29 | 8.1 | 23.4 |
| 1.0 | | 65 | 52 | 46 | 40 | 27 | 27 | 28 | 28 | 8.2 | 18.3 |
| 0.5 | J | 51 | 43 | 39 | 34 | 26 | 25 | 23 | 25 | 8.3 | 25.0 |
| 1.0 | | 55 | 45 | 41 | 35 | 23 | 23 | 24 | 25 | 8.2 | 22.4 |
| 0.5 | K | 49 | 40 | 37 | 33 | 23 | 23 | 22 | 24 | 8.2 | 25.2 |
| 1.0 | | 59 | 47 | 42 | 35 | 23 | 23 | 22 | 33 | 8.3 | 22.0 |
| 0.5 | L | 50 | 41 | 38 | 33 | 22 | 22 | 22 | 26 | 8.3 | 23.0 |
| 1.0 | | 49 | 39 | 36 | 31 | 21 | 20 | 20 | 30 | 8.3 | 17.9 |
| Base Mud | | 46 | 39 | 36 | 32 | 22 | 22 | 20 | 15 | 8.3 | 32.5 |

EXAMPLE V

Tests were run and results were evaluated to determine the approximate viscosity of the copolymer of the present invention. A 0.5% weight solution of selected copolymer sample was prepared by gradually adding 1.50 grams, dry weight basis, of the sample to 300 grams of deionized water. The solution was moderately sheared for 30 minutes at room temperature (about 25° C.) using an electric mixer, and thereafter allowed to stand at room temperature (about 25° C.) for 16 hours. The solution was then agitated with a spatula, and viscosity, in centipoises, determined at a shear rate of 511 reciprocal seconds, as determined by using a Fann Model 35 viscometer with bob and rotor R1B1. Centipoises reading was calculated as follows:

$$cps = \frac{\text{shear stress}}{\text{shear rate}} = \frac{\text{dial reading} \times \text{spring factor} \times 5.077}{511} \times 100$$

spring factor = 1

Table V, below, shows the results of these tests.

TABLE V

| Sample No. | Composition, Mole % | | | | Viscosity, cps |
| --- | --- | --- | --- | --- | --- |
| | A | B | C | D | |
| A | 73.2 | 24.4 | 2.4 | | 23 |
| B | 78.3 | 19.5 | 2.2 | | 21 |
| D | 90.0 | 9.8 | 0.2 | | 26 |
| E | 75.0 | 24.5 | 0.5 | | 18 |
| F | 90.0 | 9.5 | 0.5 | | 14 |
| G | 70.0 | 30.0 | | | 30 |
| I | 50.0 | 50.0 | | | 37 |
| K | 30.0 | 70.0 | | | 44 |
| L | | 50.0 | | 50.0 | 25 |

A = Acrylamide
B = Sodium 2-acrylamide-2-methyl propane
C = 2 Methacryloyloxy-ethyl trimethyl ammonium metho-sulfate
D = Methyl-acrylamide Although the invention has been decribed in terms of specified embodiments which are set forth in detail, it should be understood that this is by way of illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

We claim:

1. In a method of drilling a well into a subterranean formation in which an aqueous drilling fluid containing clayey material is circulated into the well, the steps of forming a filter cake on the wall of the well to decrease loss of fluid from the drilling fluid, which comprises: (1) admixing with said drilling fluid an amount of at least about 0.25 pounds per 42 gallon barrel of a copolymer of: (a) from between about 8 mole percent and about 70 mole percent of a (meth) acrylamido alkyl sulfonic acid or alkali metal salt thereof; and (b) from between about 30 mole percent and about 91 mole percent of a (meth) acrylamide or N-alkyl (meth) acrylamide, a 0.5% by weight aqueous solution of said copolymer having a viscosity of about 25° C. of from between about 18 centipoises and about 44 centipoises, as determined at a shear rate of 511 reciprocal seconds, the number of carbon atoms in the alkyl portion of the acrylamido-alkyl sulfonic acid or alkali metal salt thereof being about four, and the number of carbon atoms in the alkyl portion of the N-alkyl (meth) acrylamide being from between about 1 and about 3.

2. The method of claim 1 wherein the amount of said (meth) acrylamido alkyl sulfonic acid or alkali metal salt thereof is about 20 mole percent and the amount of said (meth) acrylamide or N-alkyl (meth) acrylamide is about 80 mole percent.

3. The method of claim 1 wherein said (meth) acrylamido alkyl sulfonic acid or alkali metal salt thereof is sodium 2-acrylamido-2-methyl propane sulfonate.

4. The method of claim 1 wherein said (meth) acrylamide is acrylamide.

5. The method of claim 1 wherein said (meth) acrylamido alkyl sulfonic acid or alkali metal salt thereof is sodium 2-acrylamido-2-methyl propane sulfonate in an amount of about 20 mole percent and said (meth) acrylamide is acrylamide in an amount of about 80 mole percent.

6. In a method of drilling a well into a subterranean formation in which an aqueous drilling fluid containing clayey material is circulated into the well, the steps of forming a filter cake on the wall of the well to decrease loss of fluid from the drilling fluid, which comprises: (1) admixing with said drilling fluid an amount of at least about 0.25 pounds per 42 gallon barrel of a cross-linked copolymer of: (a) from between about 8 mole percent and about 70 mole percent of a (meth) acrylamide alkyl sulfonic acid or alkali metal salt thereof; (b) from between about 30 mole percent and about 91 mole percent of a (meth) acrylamide or N-alkyl (meth) acrylamide; and (c) from between about 0.2 mole percent and about 4.4 mole percent of a quaternary ammonium salt selected from the class consisting of 3-methacryloyloxy-2-hydroxy propyl trimethyl ammonium chloride, 3-acrylamide-3-methylbutyl trimethyl ammonium chloride, diallyl dimethyl ammonium chloride, N-methyl 2-vinyl pyridinium methyl sulfate, N-methyl 4-vinyl pyridinium methyl sulfate, N-propyl acrylamide trimethyl ammonium chloride, and 2-methacryloyloxyethyl trimethyl ammonium methoxulfate, a 0.5% by weight aqueous solution of said copolymer having a viscosity at about 25° C. between about 18 centipoises and about 44 centipoises, as determined at a shear rate of 511 reciprocal seconds, the number of carbon atoms in the alkyl portion of the acrylamido-alkyl sulfonic acid or alkali metal salt thereof being about four, and the number of carbon atoms in the alkyl portion of the N-alkyl (meth) acrylamide being between from about 1 and about 3; and (2) circulating said drilling fluid in said well.

7. The method of claim 6 wherein the amount of said (meth) acrylamido alkyl sulfonic acid or alkali metal salt thereof is about 9.8 mole percent; the amount of said (meth) acrylamide or N-alkyl (meth) acrylamide is about 90 mole percent; and the amount of said quaternary ammonium salt is about 0.2 mole percent.

8. The method of claim 6 wherein said (meth) acrylamido alkyl sulfonic acid or alkali metal salt thereof is sodium 2-acrylamido-2-methyl propane sulfonate.

9. The method of claim 6 wherein said (meth) acrylamide is acrylamide.

10. The method of claim 6 wherein said quaternary ammonium salt is a (meth) acryloyloxy alkyl trimethyl ammonium salt.

11. The method of claim 6 wherein said quaternary ammonium salt is 2-methacryloyloxy-ethyl trimethyl ammonium methosulfate.

12. The method of claim 6 wherein said (meth) acrylamido alkyl sulfonic acid or alkali metal salt thereof is sodium 2-acrylamido-2-methyl propane sulfonate in an amount of about 9.8 mole percent; said (meth) acrylamide is acrylamide in an amount of about 90 mole percent; and said quaternary ammonium salt is 2-methylacryloyloxy-ethyl trimethyl ammonium methosulfate in an amount of about 0.2 mole percent.

13. An aqueous drilling fluid comprising water, a clayey substance suspended in said water, and at least about 0.25 pounds per 42 gallon barrel of a copolymer of: (a) from between about 8 mole percent and about 70 mole percent of a (meth) acrylamido alkyl sulfonic acid or alkali metal salt thereof; and (b) from between about 30 mole percent and about 91 mole percent of a (meth) acrylamide or N-alkyl (meth) acrylamide, a 0.5% by weight aqueous solution of said copolymer having a viscosity of about 25° C. of from between about 18 centipoises and about 44 centipoises, as determined at a shear rate of 511 reciprocal seconds, the number of carbon atoms in the alkyl portion of the acrylamidoalkyl sulfonic acid or alkali metal salt thereof being about four, and the number of carbon atoms in the alkyl portion of the N-alkyl (meth) acrylamide being from between about 1 and about 3.

14. The drilling fluid of claim 13 wherein the amount of said (meth) acrylamide or N-alkyl (meth) acrylamide is about 80 mole percent.

15. The drilling fluid of claim 13 wherein the amount of said (meth) acrylamido alkyl sulfonic acid or alkali metal salt thereof is about 20 mole percent and the amount of said (meth) acrylamide or N-alkyl (meth) acrylamide is about 80 mole percent.

16. The drilling fluid of claim 13 wherein said (meth) acrylamido alkyl sulfonic acid or alkali metal salt thereof is sodium 2-acrylamido-2-methyl propane sulfonate.

17. The drilling fluid of claim 13 wherein said (meth) acrylamide is acrylamide.

18. The drilling fluid of claim 13 wherein said (meth) acrylamido alkyl sulfonic acid or alkali metal salt thereof is sodium 2-acrylamido-2-methyl propane sulfonate in an amount of about 20 mole percent and said (meth) acrylamide is acrylamide in an amount of about 80 mole percent.

19. An aqueous drilling fluid comprising water, a clayey substance suspended in said water, and at least about 0.25 pounds per 42 gallon barrel of a cross-linked copolymer of: (a) from between about 8 mole percent and about 70 mole percent of a (meth) acrylamide alkyl sulfonic acid or alkali metal salt thereof; (b) from between about 30 mole percent and about 91 mole percent of a (meth) acrylamide or N-alkyl (meth) acrylamide; and (c) from between about 0.2 mole percent and about 4.4 mole percent of a quaternary ammonium salt selected from the class consisting of 3-methacryloyloxy-2-hydroxy propyl trimethyl ammonium chloride, 3-acrylamido-3-methylbutyl trimethyl ammonium chloride, diallyl dimethyl ammonium chloride, N-methyl 2-vinyl pyridinium methyl sulfate, N-methyl 4-vinyl pyridinium methyl sulfate, N-propyl acrylamido trimethyl ammonium chloride, and 2-methacryloyloxyethyl trimethyl ammonium methosulfate, a 0.5% by weight aqueous solution of said copolymer having a viscosity at about 25° C. of from between about 18 centipoises and about 44 centipoises, as determined at a shear rate of 511 reciprocal seconds, the number of carbon atoms in the alkyl portion of the acrylamidoalkyl sulfonic acid or alkali metal salt thereof being about four, and the number of carbon atoms in the alkyl portion of the N-alkyl (meth) acrylamide being from between about 1 and about 3.

20. The drilling fluid of claim 19 wherein the amount of said (meth) acrylamido alkyl sulfonic acid or alkali metal salt thereof is about 9.8 mole percent; the amount of said (meth) acrylamide or N-alkyl (meth) acrylamide is about 90 mole percent; and the amount of said quaternary ammonium salt is about 0.2 mole percent.

21. The drilling fluid of claim 19 wherein said (meth) acrylamido alkyl sulfonic acid or alkali metal salt thereof is soidum 2-acrylamido-2-methyl propane sulfonate.

22. The drilling fluid of claim 19 wherein said (meth) acrylamide is acrylamide.

23. The drilling fluid of claim 19 wherein said quaternary ammonium salt is a (meth) acryloyloxy alkyl trimethyl ammonium salt.

24. The drilling fluid of claim 19 wherein said quaternary ammonium salt is 2-methacryloyloxy-ethyl trimethyl ammonium methosulfate.

25. The drilling fluid of claim 19 wherein said (meth) acrylamido alkyl sulfonic acid or alkali metal salt thereof is sodium 2-acrylamido-2-methyl propane sulfonate in an amount of about 9.8 mole percent; said (meth) acrylamide is acrylamide in an amount of about 90 mole percent; and said quaternary ammonium salt is 2-methacryloyloxy-ethyl trimethyl ammonium methosulfate in an amount of about 0.2 mole percent.

* * * * *